United States Patent
Yeo et al.

(10) Patent No.: US 8,102,263 B2
(45) Date of Patent: Jan. 24, 2012

(54) PASSIVE TAG INCLUDING VOLATILE MEMORY

(75) Inventors: Junho Yeo, Daegu (KR); Josef Preishuber-Pfluegl, Klagenfurt (AT); Alex Janek, Graz (AT); Andreas Schuhal, Pöttschach (AT); Hae-Won Son, Daejeon (KR); Jae-Young Jung, Daejeon (KR); Hee-Sook Mo, Daejeon (KR); Ji-Hoon Bae, Daejeon (KR); Gil-Young Choi, Daejeon (KR); Cheol-Sig Pyo, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 389 days.

(21) Appl. No.: 11/931,222

(22) Filed: Oct. 31, 2007

(65) Prior Publication Data
US 2008/0136596 A1     Jun. 12, 2008

(30) Foreign Application Priority Data
Dec. 8, 2006   (KR) .................. 10-2006-0125035

(51) Int. Cl.
*G08B 13/14*   (2006.01)
(52) U.S. Cl. ............... 340/572.1; 340/10.34; 340/13.26
(58) Field of Classification Search .............. 340/10.1, 340/10.2, 10.3, 10.4, 10.5, 505, 572.1, 13.26, 340/10.34
See application file for complete search history.

(56) References Cited

U.S. PATENT DOCUMENTS

| | | | | |
|---|---|---|---|---|
| 5,214,409 | A | * | 5/1993 | Beigel .................... 340/572.1 |
| 5,317,309 | A | | 5/1994 | Vercellotti et al. |
| 5,485,623 | A | * | 1/1996 | Kurokawa et al. ............. 714/22 |
| 5,621,384 | A | * | 4/1997 | Crimmins et al. ......... 340/539.3 |
| 5,686,902 | A | * | 11/1997 | Reis et al. .................... 340/10.2 |
| 6,294,997 | B1 | * | 9/2001 | Paratore et al. ............ 340/572.1 |
| 6,738,710 | B2 | * | 5/2004 | Nagaki ....................... 701/208 |
| 7,116,230 | B2 | * | 10/2006 | Klowak ..................... 340/572.1 |
| 7,463,153 | B2 | * | 12/2008 | Hunt et al. ................. 340/572.4 |
| 7,541,929 | B2 | * | 6/2009 | Zimmerman et al. ..... 340/572.1 |
| 7,554,445 | B2 | * | 6/2009 | Script et al. ................ 340/545.1 |
| 7,607,014 | B2 | * | 10/2009 | Larson et al. ................. 713/168 |
| 2005/0216121 | A1 | | 9/2005 | Sawada et al. |
| 2006/0276206 | A1 | * | 12/2006 | Shiotsu et al. ................ 455/462 |
| 2006/0279412 | A1 | * | 12/2006 | Holland et al. ............ 340/10.51 |
| 2008/0135615 | A1 | * | 6/2008 | Moran ......................... 235/439 |
| 2008/0174422 | A1 | * | 7/2008 | Freathy et al. ............ 340/539.13 |

FOREIGN PATENT DOCUMENTS

| | | |
|---|---|---|
| JP | 2006-178770 | 7/2006 |
| JP | 2006-215876 | 8/2006 |
| KR | 10-2004-0076589 | 9/2004 |
| WO | WO2005057688 | 6/2005 |

* cited by examiner

*Primary Examiner* — Daniel Wu
*Assistant Examiner* — Rufus Point
(74) *Attorney, Agent, or Firm* — Kile Park Goekjian Reed & McManus PLLC

(57) ABSTRACT

A passive tag including a volatile memory is provided. The passive tag includes: a sensing unit which senses or measures information about environmental surroundings of the tag; a volatile memory; a non-volatile memory; and a control unit which firstly stores resultant data sensed or measured by the sensing unit in the volatile memory and then moves the data stored in the volatile memory to the non-volatile memory according to pre-set conditions. Therefore, the life of the tag is prolonged and stability of important data can be secured.

6 Claims, 2 Drawing Sheets

PASSIVE TAG INCLUDING VOLATILE MEMORY

CROSS-REFERENCE TO RELATED PATENT APPLICATION

This application claims the benefit of Korean Patent Application No. 10-2006-0125035, filed on Dec. 8, 2006, in the Korean Intellectual Property Office, the disclosure of which is incorporated herein in its entirety by reference.

BACKGROUND OF THE INVENTION

1. Field of the Invention

The present invention relates to a Radio Frequency Identification (RFID) tag, and more particularly, to a passive RFID tag which maximizes energy efficiency when storing data.

The present invention is derived from the research performed as a part of the information technology (IT) new growth power core technology development business, which was hosted by the Ministry of Information and Communications Republic of Korea (MIC) and the Institute for Information Technology Advancement (IITA) [Task management No.: 2005-S-106-02, entitled "Development of Sensor Tag and Sensor Node Technologies for RFID/USN"].

2. Description of the Related Art

A Radio Frequency Identification (RFID) is a process or chip which puts information about processes of producing, distributing, storing, and selling products into a tag attached to the products, has its own antenna, makes a RFID reader read the information, and connects with an artificial satellite or uses mobile communication in order to access an information system.

Meanwhile, a RFID system includes a tag and a reader, wherein the tag stores information and exchanges data according to a protocol and the reader communicates with the tag.

The RFID tag can be classified into an active type and a passive type, wherein the active type needs a power source and uses a direct power supply, and the passive type is operated by an electromagnetic field of the reader without power being supplied directly from inside or outside of the RFID tag. By using the active type, required power for the reader is reduced and an identification distance may be far from the reader. However, since a power supply device is needed, the operation time is limited and the cost of the active type is more expensive than the passive type. On the other hand, the passive type is lighter than the active type, the cost of the passive type is less than the active type, and the passive type can be used semi-permanently. However, when the passive type is used, an identification distance is short and more power is consumed by the reader, compared to when the active type is used.

In addition, a battery powered passive tag, which combines the active type and the passive type, has been suggested.

According to the conventional battery powered passive tag, a non-volatile memory is generally used as a storing means for stability of data. However, the amount of power consumption is large and thus, the life of the tag is reduced. In particular, in a sensor tag which is generally used in a ubiquitous sensor network (USN), the power is periodically consumed to measure various environmental factors, for example, temperature and humidity. Accordingly, the life of the tag, that is, the life of the battery included in the tag, is reduced.

SUMMARY OF THE INVENTION

The present invention provides a passive tag including a volatile memory which lengthens the life of a battery included in the passive tag so as to secure stability of data.

According to an aspect of the present invention, there is provided passive tag which communicates with a Radio Frequency Identification (RFID) reader, the passive tag including: a sensing unit which senses or measures information about environmental surroundings of the tag; a volatile memory; a non-volatile memory; and a control unit which firstly stores resultant data sensed or measured by the sensing unit in the volatile memory and then moves the data stored in the volatile memory to the non-volatile memory according to pre-set conditions.

The passive tag may further include a power supply unit which supplies the power required to operate the tag according to a predetermined control strategy; a power receiving unit which receives an RF signal including the operating power of the tag from the RFID reader; and a power management unit which measures a strength of the RF signal received from the power receiving unit and supplies the power of the power supply unit or the RF power received from the RFID reader to the tag according to the strength of the RF signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
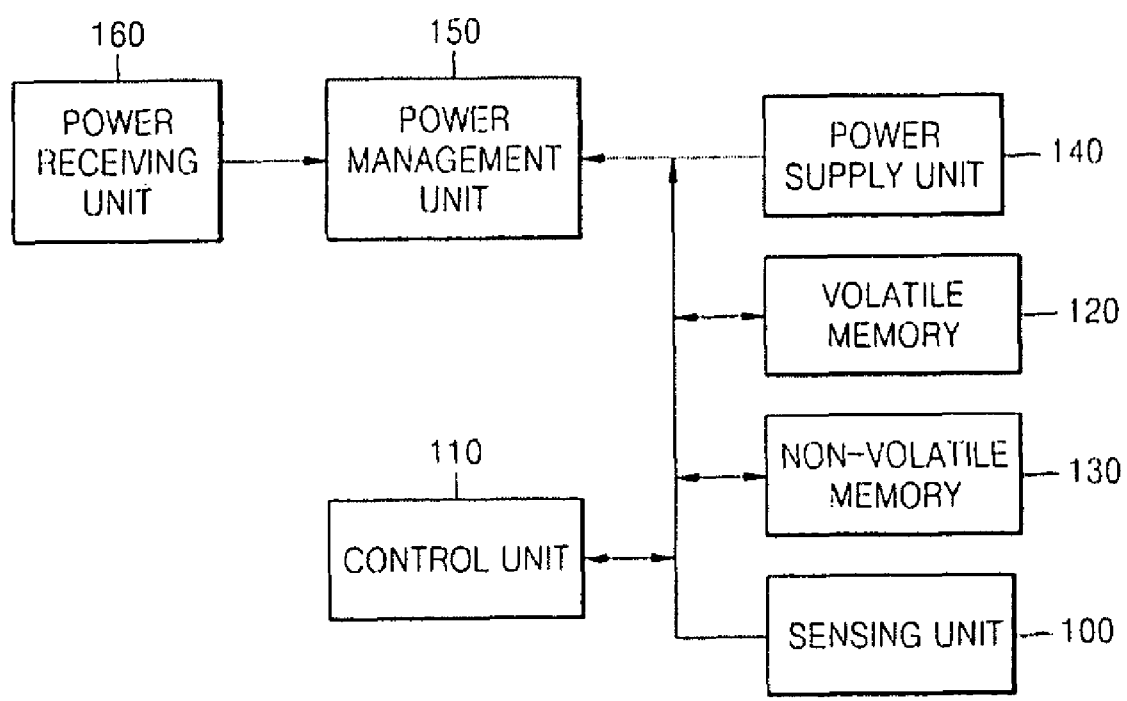
FIG. 1 is a block diagram of a passive tag including a volatile memory according to an embodiment of the present invention.

FIG. 1 is a block diagram of a passive tag including a volatile memory according to an embodiment of the present invention.

The passive tag which communicates with a Radio Frequency Identification (RFID) reader includes a sensing unit which senses or measures information about the environment surrounding the tag, a volatile memory 120, a non-volatile memory 130, and a control unit 110 which firstly stores resultant data sensed or measured by the sensing unit 100 in the volatile memory 120 and then moves the data stored in the volatile memory 120 to the non-volatile memory 130 according to a pre-set condition.

In addition, the passive tag further includes a power supply unit 140, a power receiving unit 160, and a power management unit 150, wherein the power supply unit 140 supplies the power required to operate the tag according to a predetermined control strategy, the power receiving unit 160 receives an RF signal including the operating power of the tag from the RFID reader, and the power management unit 150 measures the strength of the RF signal received from the power receiving unit 160 and supplies the power of the power supply unit 140 or the RF power received from the RFID reader to the tag according to the strength of the RF signal.

Figure 2:
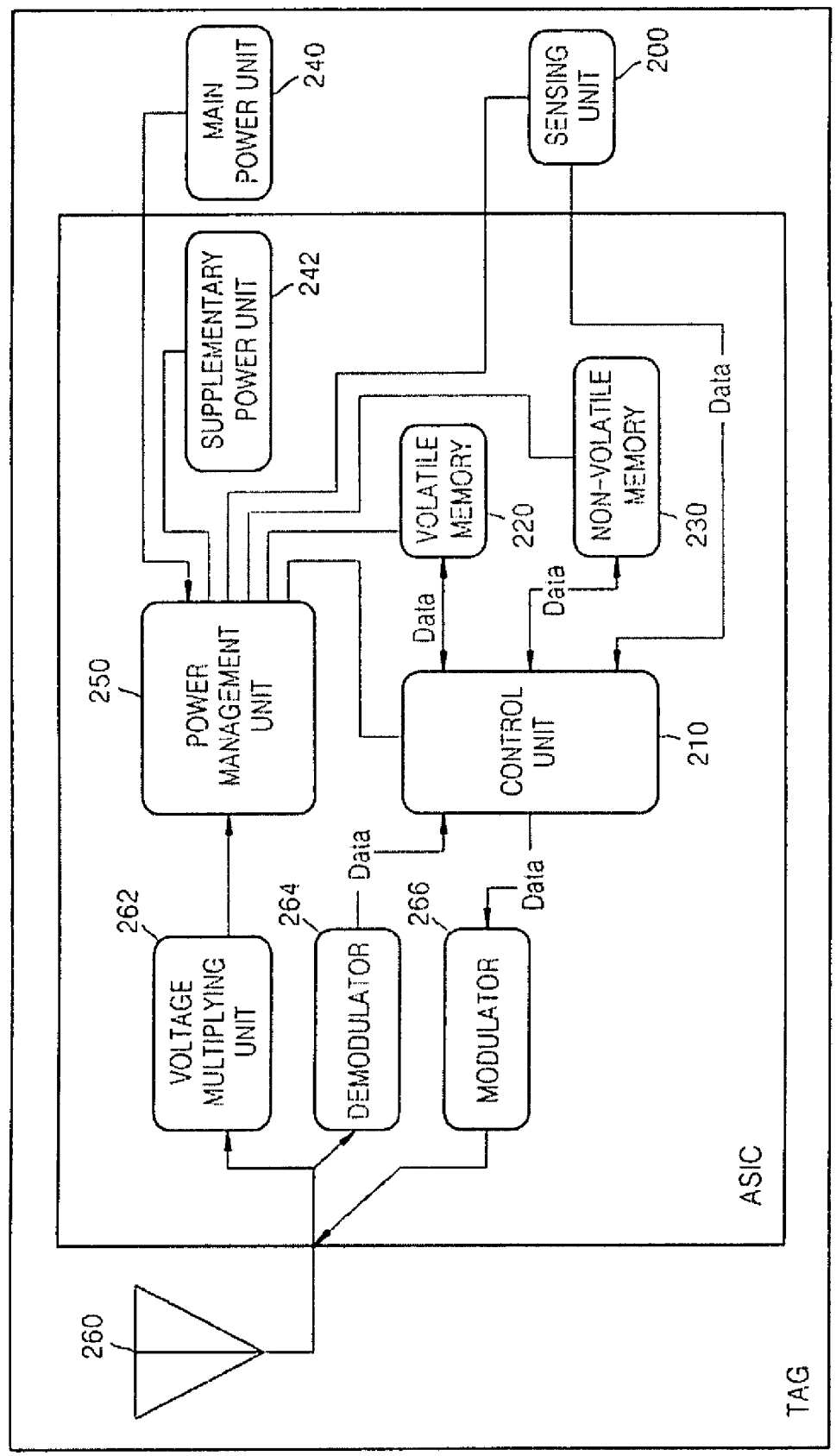
FIG. 2 illustrates the passive tag of FIG. 1 in more detail according to an embodiment of the present invention.

FIG. 2 illustrates the passive tag of FIG. 1 in more detail according to an embodiment of the present invention.

The passive tag includes an antenna 260, a voltage multiplying unit 262 (RF to DC), a demodulator 264, a modulator 266, a power management unit 250, a main power unit 240, a supplementary power unit 242, a volatile memory (VM) 220, a non-volatile memory (NVM) 230, a sensing unit 200, and a control unit 210.

Comparing FIG. 2 and FIG. 1, the power supply unit 140 of FIG. 1 corresponds to the main power unit 240 and the supplementary power unit 242 of FIG. 2, the power receiving unit 160 of FIG. 1 corresponds to the antenna 260 and the voltage multiplying unit 262 of FIG. 2, the power management unit 150 of FIG. 1 corresponds to the power management unit 250 of FIG. 2, and the control unit 110 of FIG. 1 corresponds to the control unit 210 of FIG. 2.

The voltage multiplying unit 262 converts the analog RF signal received through the antenna 260 into a digital signal and outputs the digital signal to the power management unit 250.

The demodulator 264 demodulates the data received through the antenna 260 and outputs the demodulated data to the control unit 210. The modulator 266 modulates data input from the control unit 210 and transmits the modulated data to the RFID reader through the antenna 260.

In the volatile memory 220, 'sensing data' measured or sensed by the sensing unit 200 is stored. Here, it is well known that the volatile memory 220 has a risk of losing data compared with the non-volatile memory 230 with respect to storing data. However, power consumption for reading and writing data is lower than that of the non-volatile memory 230.

The power management unit 250 measures the strength of the power of the RF signal input from the voltage multiplying unit 262 and outputs the 'strength information' about the corresponding signal to the control unit 210. In addition, based on the signal input from the control unit 210 according to the strength information, the RF power or the power from the main power unit 240 excited by the RF signal that is transmitted from the RFID reader is supplied to elements, which need a power supply, in the tag, that is, the volatile memory 220, the non-volatile memory 230, the sensing unit 200, the supplementary power unit 242, and the control unit 210.

Moreover, the power management unit 250 measures the remaining amount of power of the main power unit 240 and corresponding 'remaining information' is output to the control unit 210.

When it is determined through the strength information input from the power management unit 250 that the RF power is sufficient as the power used to operate the tag, the control unit 210 controls the power management unit 250 so as to accomplish the power supply according to a predetermined method, for example, a backscatter coupling method. In addition, when the RF power is not sufficient, the control unit 210 controls the power management unit 250 so that the power stored in the main power unit 240 is used.

The main power unit 240, which is a power supplier, includes a battery so as to store and supply the power and the supplementary power unit 242 includes a capacitive device so as to store and supply the power.

In addition, when it is determined from the remaining information input from the power management unit 250 that insufficient power remains in the battery of the main power unit 240 is not sufficient, the control unit 210 controls the modulator 266 so that a signal indicating that no power remains in the main power unit 240 is transmitted to the RFID reader by using the RF power transmitted from the reader.

Moreover, the control unit 210 stores the sensing data input from the sensing unit 200 to the volatile memory 220.

When power is not supplied to the volatile memory 220, information stored in the volatile memory 220 is lost. Thus, in order to prevent this, the control unit 210 manages data according to loss prevention methods. That is, the control unit 210 moves the data that is firstly stored in the volatile memory 220 to the non-volatile memory 230 to be stored according to pre-set conditions.

In the loss prevention methods, when the following four events occur, the data stored in the volatile memory 220 is moved to the non-volatile memory 230.

A first event is a 'data move command' received from the RFID reader. When the data move command is input through the demodulator 264, the control unit 210 performs the loss prevention method. In other words, the sensing data stored in the volatile memory 220 is moved to the non-volatile memory 230. Here, such process is performed by using the RF power that is received with the data move command so that the power stored in the main power unit 240 is not consumed.

A second event is based on an 'exceeded amount' of the power remaining after the power is supplied to each element of the tag by using the RF power received from the RFID reader. In order to prevent the exceeded amount from being discarded, the control unit 210 controls the power management unit 250 so as to supply the exceeded amount of the power to the volatile memory 220 and the non-volatile memory 230 and moves the data stored in the volatile memory 220 to the non-volatile memory 230. Here, since the power needed to move and maintain the data is supplied with the exceeded amount of power, the power of the main power unit 240 should not be consumed. In addition, the exceeded amount of power can be used to charge the supplementary power unit 242 including a capacitive device.

A third event is based on the case where the RF power received from the RFID reader is not sufficient to operate the tag. The control unit 210 controls the power management unit 250 so as to supply the power from the supplementary power unit 242 to the volatile memory 220 and the non-volatile memory 230 and moves the data stored in the volatile memory 220 to the non-volatile memory 230.

A fourth event is based on the case where the remaining power in the main power unit 240 is not sufficient. Here, the control unit 210 controls the power management unit 250 so as to supply the power from the supplementary power unit 242 to the volatile memory 220 and the non-volatile memory 230 and moves the data stored in the volatile memory 220 to the non-volatile memory 230.

In each event described above, use of the power stored in the main power unit 240 is restricted, if possible, and use of the power excited due to the RF signal is maximized. As a result, the life of the battery which is the main power unit is prolonged.

According to the present invention, the passive tag which communicates with the RFID reader includes the sensing unit which senses or measures information about the surroundings of the tag, the volatile memory, the non-volatile memory, and the control unit which firstly stores resultant data sensed or measured by the sensing unit in the volatile memory and then moves the data stored in the volatile memory to the non-volatile memory according to pre-set conditions. Thus, the life of the tag is prolonged and stability of important data can be secured.

In addition, it is obvious to one of ordinary skill in the art that each process can be embodied in various ways with software or hardware by using a general programming method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A semi-passive tag which communicates with a Radio Frequency Identification (RFID) reader, the semi-passive tag comprising:
    a sensing unit which senses or measures information about environmental surroundings of the tag;
    a volatile memory;
    a non-volatile memory;
    a power receiving unit which receives an RF signal including operating power of the tag from the RFID reader;
    a power supply unit which supplies power required to operate the tag; and
    a control unit which monitors first and second power levels of first power received in the power receiving unit and of second power available from the power supply unit, stores resultant data sensed or measured by the sensing unit in the volatile memory, and moves the data stored in the volatile memory to the non-volatile memory when the first power level falls below a first threshold or the second power level falls below a second threshold different from the first threshold,
    wherein the control unit is further operative to transmit to the RFID reader a signal indicating that insufficient power remains when the power remaining in the power supply unit is insufficient to operate the tag.

2. The semi-passive tag of claim 1, further comprising:
    a power management unit which measures a strength of the RF signal received from the power receiving unit and supplies the power of the power supply unit or the RF power received from the RFID reader to the tag according to the strength of the RF signal.

3. The semi-passive tag of claim 1, wherein the control unit further moves the data stored in the volatile memory to the non-volatile memory when a data move command is received from the RFID reader.

4. The semi-passive tag of claim 1, wherein the control unit further moves the data stored in the volatile memory to the non-volatile memory when an exceeded amount of the power remains after the power is supplied to each element of the tag by using the RF power received from the RFID reader.

5. The semi-passive tag of claim 2, wherein the first threshold indicates when the RF power received from the RFID reader is not sufficient to operate the tag and the second threshold indicates when the remaining power in the power supply unit is not sufficient to operate the tag.

6. The semi-passive tag of claim 2, wherein the power supply unit comprises a battery and a capacity device.

* * * * *